Dec. 3, 1963 H. H. KIEFER 3,112,727
AMPHIBIOUS VEHICLE
Filed Aug. 16, 1961 2 Sheets-Sheet 2
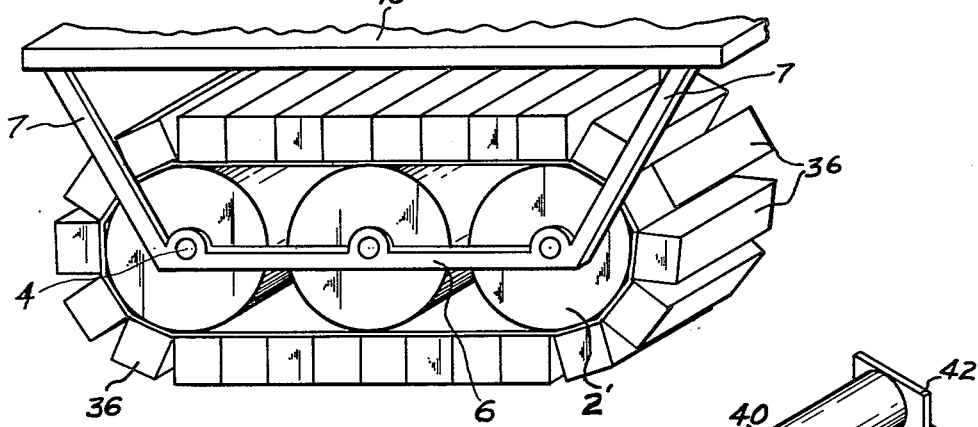
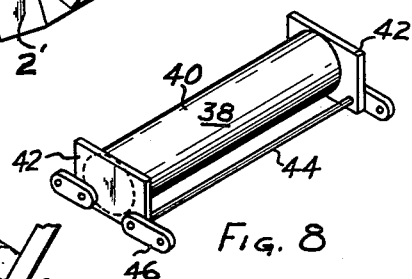
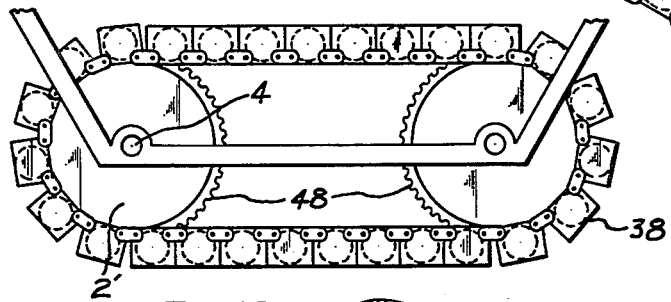
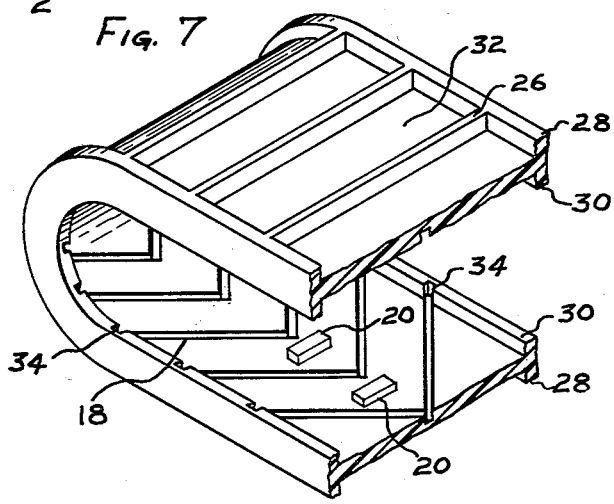
INVENTOR.
HOWARD H. KIEFER
BY
WYNNE & FINKEN
ATTORNEYS United States Patent Office 3,112,727
Patented Dec. 3, 1963

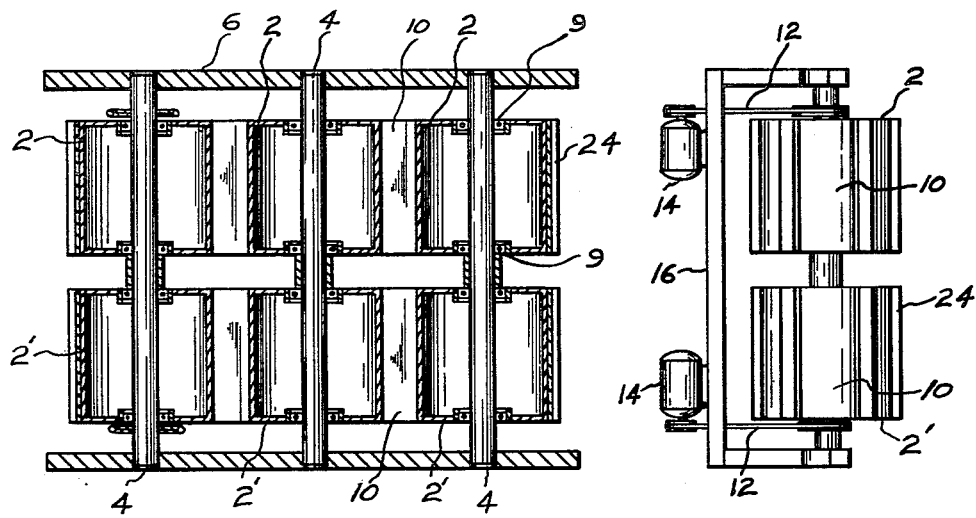
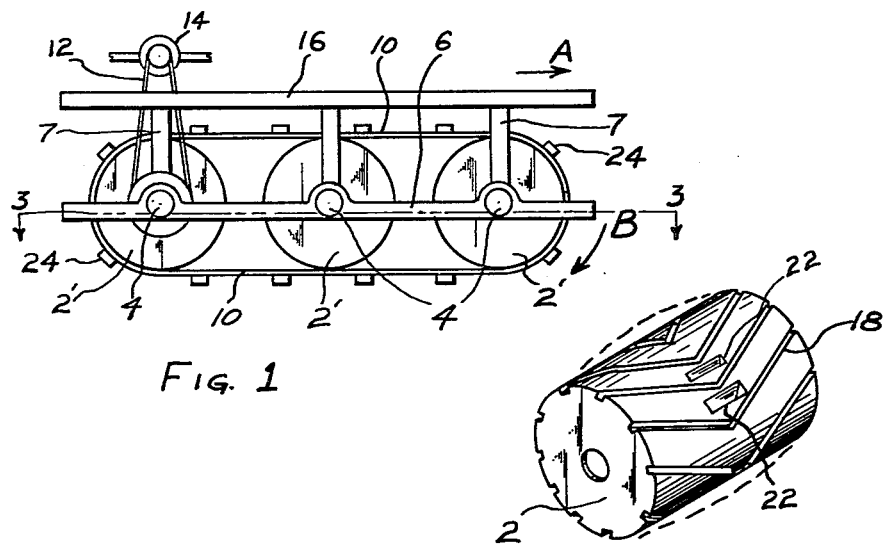
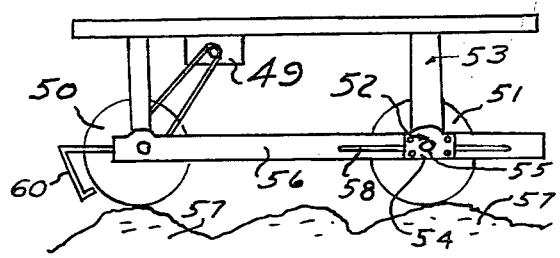

3,112,727
AMPHIBIOUS VEHICLE
Howard H. Kiefer, New Hartford, N.Y.
(35 Roberta Road, Pittsfield, Mass.)
Filed Aug. 16, 1961, Ser. No. 131,833
1 Claim. (Cl. 115—1)

This invention relates to vehicles and more particularly to an improved amphibious type of vehicle.

Amphibious vehicles in use today combine a multiplicity of elements and devices each of which is necessary to perform one or more of the functions required for the successful operation of such a vehicle under varying environments. For example, the vehicle must be provided with means for propulsion, support, and steering both on land and in the water and under varying conditions in each of these environments. The complexity and number of elements and devices required in an amphibious vehicle to perform all of these functions is, therefore, very great.

Accordingly, it is the primary object of this invention to provide an amphibious type vehicle that is more versatile on both land and water than those currently being used. More specifically, it is an object of this invention to provide an amphibious vehicle of the interface drive type that incorporates driving features that provide more efficient operating characteristics than known heretofore. Another object is to integrate the functions of propulsion support, and steering of such a vehicle into a simple mechanism that cannot only be readily used in a working craft but also in a toy. Other objects and advantages of this invention will be apparent to those skilled in the art from the detailed discussion of the figures of the drawings identified below.

Basically, my invention combines one or more endless belts which may carry paddles, cleats, or treads and which are stretched over a plurality of drums, rotated by one or more sources of power in such a manner that the combination of two simple elements, i.e., the belts and drums, provide propulsion, support, and steering for the vehicle without the necessity of separate hull structures, propulsive means, or steering mechanism.

Referring to the drawings,

FIGURE 1 is a view in side elevation of one form of vehicle constructed in accordance with my invention.

FIGURE 2 is a view in end elevation of the vehicle in FIGURE 1.

FIGURE 3 is a sectional view of the vehicle in FIGURE 1, viewed in the direction of arrows 3—3.

FIGURE 4 is a perspective view of a drum, more fully described below, and used in one embodiment of my invention.

FIGURE 5 is a perspective view, partly broken away, of a modified embodiment of the endless belt used in my invention and more fully described below.

FIGURE 6 is a perspective view of a further modification of the endless belt referred to above.

FIGURE 7 is a view in side elevation illustrating still another modification of the endless belt.

FIGURE 8 is a perspective view illustrating features of construction of the belt in FIGURE 7.

FIGURE 9 is a side view of a modification.

Proceeding to a detail description of my invention and referring particularly to FIGURES 1 and 3, a load support member or platform 16 carries downwardly depending members 7 rigidly secured thereto. A plurality of drums 2, 2', suitably journaled on bearings 9, are mounted on horizontal parallel shafts 4 which are carried by and fixed within a suitable framework 6 secured to the depending members 7. Each drum 2 is independently rotatable with respect to the other drum 2' on the same shaft.

FIGURE 3 illustrates an arrangement of six drums mounted on the three parallel shafts 4 so as to form two longitudinal trains of three drums 2, 2, 2 and 2', 2', 2' each. Obviously, however, other arrangements of these drums will suggest themselves.

As shown by the embodiment of my invention illustrated in FIGURES 1 and 3, an endless belt 10 surrounds each train of drums in such a manner that rotation of one or more of the drums 2 enclosed within each belt will cause rotation of the belt itself as well as rotation of the other drums in the same train. Any convenient known means can be used to fasten each belt to its enclosed drums. For example, in one embodiment of my invention, more fully described hereinafter, the belts 10 may be of material with sufficient elasticity to be tightened around the drums so as to cause greater friction between belt and drums than between belts and any exterior surface with which the belts come into contact. Thus, the rotation of drums would cause a corresponding belt rotation. Other means of securing the belts to the drums will suggest themselves, should belts of less elasticity be desired.

In order to provide rotation of the drums 2 and belt 10 in each train, one or more of the drums in each train is connected by any known means such as a belt 12 to a suitable power source 14, a separate power source being supplied to each train of drums. In the embodiment illustrated in FIGURES 1 and 2 each of the two trains of drums is supplied with a separate motor furnishing power to one drum of that train. Again, other arrangements for the motors, as well as other sources of power will suggest themselves. One such arrangement consists of a single engine having separate power take-off and control means, such as clutches and transmissions, for each train, as will be apparent to those skilled in the art.

It will now be noted that the above described simple arrangement provides all of the functions essential to an amphibious vehicle.

The drums 2, 2' can be of hollow construction, as shown in FIGURE 3, or constructed of buoyant material so as to provide the buoyancy required to support the vehicle in water or mud. At the same time, the drums may be sufficiently rigid to support the vehicle upon solid surfaces. In addition, the drums provide for transmission of power from the power sources to the endless belts.

The endless belts 10 provide the means for propelling the vehicle, while at the same time lending support to the over-all structure. As the belts 10 move in one direction, the vehicle will be propelled in the opposite direction against whatever surface it is in contact as indicated by the directions A and B in FIGURE 1. As will be described more fully below, the belts, as well as the drums, can be constructed in a variety of ways depending upon the environment in which the vehicle will operate and the characteristics of operation which are desired.

Because there is more than one belt providing propulsion and because each belt operates independently of the others, a method of steering the vehicle is automatically provided. By rotating the belts 10 independently at different speeds, or in opposite directions, the vehicle can be made to turn on any degree of radius, even upon its own axis.

While no separate hull structure is required in my vehicle, the frame 6 may be used to support additional vehicle housing upon a supporting platform 16 in certain embodiments of my invention.

In order to prevent the accumulation of water, soil, or other surface materials between the drums 2 and the belts 10, if environmental conditions so require, grooves 18 canted rearwardly from the direction of rotation can be provided in either the drums or the belts. Such grooves would have a natural tendency to expel undesirable accumulations. One form of such groove 18 is illustrated in FIGURES 4 and 5 although other methods for eliminating undesirable accumulations will suggest themselves. Movement of the drums 2 and belts 10 during operation of the vehicle provides a centrifugal force type pumping action in grooves 18 so that any undesirable material disposed thereon or therebetween is expelled to prevent abnormal wear or inefficient performance. While the drums 2 are illustrated as true cylinders, it is apparent they can be "barrel" or oval shaped to aid in retaining the belts in a central position on the drums and further assist the previously mentioned fluid pumping action, FIG. 4 in phantom.

In addition, by providing suitable slots or grooves 22 in either the belts or drums and matching lugs or keys 20 in the opposite members, a means of locking the belts to the drums can be provided which would allow looser-fitting belts than those dependent entirely upon friction to prevent slippage between belts and drums.

In order to provide more efficient propulsion and to increase the efficiency of operation under diverse conditions, the belts may be constructed in a variety of ways. Paddles, cleats, or treads may be attached to the belts 10, or molded as an integral part of the belts. FIGURE 1 illustrates but one form of cleat 24 attached to the belts while FIGURE 5 illustrates one form of belt with a molded tread 26. Structurally the molded treads 26 are integral with a belt member 10 comprising outer and inner vertical side flanges 28 and 30 respectively. Of course, it is apparent to one skilled in this art that these side flanges can be integral with or detachably mounted to the belt and perform in an identical manner. It is preferred to integrally mold the belt and side flanges from synthetic rubber. Referring to FIGURE 5, the outer side flange portion 28 performs a function heretofore unkown in this art. Rotation of the belt 10 over the drums 2 causes side flange portions 28 to engage the water prior to the tread 26 coming into contact with the same. The side flange portions 28 then prevent side flow away from the tread 26 thereby providing more positive contact and higher driving pressure between the tread 26 and the water retained in a belt reservoir 32. Engagement of side flanges 28 with the water also minimizes or reduces the tendency of the vehicle to be moved laterally of its path of travel when strong winds or any other force may tend to cause such movement.

Additionally, this invention affords another advantageous feature in the utilization of the inner side flange portion 30. Excessive accumulation of water or sludge between the drums 2 will create an undesirable drag on the vehicle and greatly hinder its operation. The inner side flanges 30 prevent entrance of water within the drum area thereby insuring a more desirable performance of the vehicle. Grooves 34 are provided in the inner side flanges so that the aforementioned grooves 18 in belt 10 can effectively pump out whatever substances that may accumulate between the belt and the drums 2. Of course, the design of such paddles, cleats, or treads would be dependent upon the surface or surfaces over which the vehicle is to be propelled and the function which the vehicle is to perform. Also it is desirable to coat or impregnate with a water resistant material all of the surfaces of the drums, and belts that come into contact with the fluid being traversed to afford longer wear while reducing operational friction therebetween.

Two additional belt structures which are embodiments of my invention are illustrated in FIGURES 6 and 7. In FIGURE 6 each belt is furnished with contiguous rectangular blocks 36 surrounding its exterior surface. Such an arrangement would allow the belt to rotate around its drums while maintaining a rigid flat surface beneath the drums. This belt construction could be used to convert the vehicle into an earth compacting device, for example. By varying the material used in construction of the blocks 36, the flexibility of the bearing surface of the vehicle could be regulated while still maintaining a comparatively uniform bearing surface and a desired buoyant effect.

FIGURE 7 illustrates another belt structure which maintains a rigid surface beneath the drums while rotating freely around them. In this embodiment, the bearing surface of the vehicle would be rigid and yet not solid. The entire belt is constructed of adjacent joined links 38 as illustrated in FIGURE 8. Each link 38 consists of a cylinder 40 closed at each end by a face-plate 42. The cylinder 40 can be rigidly attached to the face plates or free to rotate between them. Running between and through face-plates at two adjacent corners are two rods 44 which terminate in tie-bars 46 on the outside of the face-plates. These rods 44 are rigidly attached to the tie-bars but are free to rotate within the face-plates. The links 38 are then attached to one another by means of the tie-bars and thus integrated into a single continuous belt. The drums are fitted with the teeth or can comprise a sprocket wheel indicated at 48 into which the unit rods fit as the belt rotates around the drums. Of course, it is within the realm of this invention to provide a sprocket type wheel rather than fit a drum with a driving sprocket as shown in FIGURE 7. The unit cylinders 40 are the same length as the drums, thus allowing the face plates 42 to fit over the ends of the drums. It will be noted that this embodiment of my invention enables the vehicle to have a comparatively uniform bearing surface and yet the surface material can "breathe" by escaping through the belt. The belt has an exceptionally high resistance to lateral as well as rotational slippage on the drums due to the rod and teeth construction and the overlapping face plates. Should it become necessary to reduce vertical belt sag during use of this vehicle any suitable means may be attached to end plates 42 of links 38. In particular interlocking projections adapted to be separated as they pass around drums 2 and 2' and then be re-united while the belt is traveling in a horizontal plane would readily provide the desirable result.

In another embodiment of my invention, both the drums and the belts can be constructed of flexible material. The drums can be inflated in a manner similar to the ordinary automobile tire. Such an embodiment would be ideally suited for travel over rough terrain as well as in the water.

In its most simple and basic form, my invention would provide an extremely versatile mechanical toy of simple inexpensive construction with few moving parts and yet capable of directed movement on solid or liquid surfaces.

Thus it will be seen that my invention, by combining the simple elements of belts and drums connected to a power source, provides a simpler and more flexible amphibious vehicle capable of a wider range of efficient performance under more varying conditions of environment than heretofore possible.

My invention, as previously mentioned, may involve a non-buoyant sprocket wheel drive in place of the drum drive; in this regard, the sprocket teeth 48 shown in FIGURE 7 would be mounted on sprocket wheels instead of on the drums 2'.

If desired, a single propelling belt may be used with normal steering means provided for manipulation of the vehicle. Also, it will be recognized that all parts of the vessel in contact with the water may be treated by impregnation or coating with a water-shedding material such as Teflon, wax and the like, this treatment particularly being of value on the water remover blade, the buoyant cylindrical members, the propelling belt and the like.

It will be noted in the modification shown in FIGURE 9 that the propelling belt has been eliminated and drive is accomplished by means of buoyant cylindrical members 50 and 51, the rearward cylindrical member 50 being suitably powered by drive means 49. The forward cylindrical member 51 may also be driven but in the modification shown, it rolls freely in an adjustable bearing means 52 supported on the framework 53. Suitable adjustable bearing blocks 54 are provided at each end of the shaft 55 whereby the shaft may be moved longitudinally of the vehicle in a slot 58 in horizontal frame member 56. In this fashion, the longitudinal distance between rollers may be pre-set to provide a placement of the cylindrical members in coincidence with the shock waves 57, 57 of the water at the designed speed.

A water remover blade 60 is mounted on the horizontal frame member 56 and is positioned in close proximity to the rearward lower quadrant of the cylindrical member 59 to wipe away water carried by the cylindrical member. More than two drums may be employed in this particular embodiment and all drums may be adjustably mounted. Wiper blades may be provided in modifications shown.

While various embodiments of the invention have been illustrated and described, it will be obvious to those skilled in the art that various changes and modifications may be made without departing from the invention, and it is intended to cover in the appended claim all such changes and modifications that fall within the true spirit and scope of the invention.

I claim:

An amphibious vehicle comprising a load supporting member, downwardly depending members secured to said load supporting member at each side thereof, a horizontal member interconnecting said depending members, a plurality of shafts mounted in said members, a plurality of buoyant cylindrical members rotatably mounted on said shafts, a power source, means connecting said power source with at least one of said cylindrical members to rotate the cylindrical member, bearing blocks for supporting one of said shafts, said bearing blocks being slidably mounted in a longitudinally extending slot in said horizontal member enabling the adjustment of the longitudinal distance between the cylindrical members fore and aft to coincide with the shock waves of the water at the designed speed, and at least one water remover blade disposed parallel to the axis of at least one of said cylindrical members.

References Cited in the file of this patent

UNITED STATES PATENTS

| | | |
|---|---|---|
| 1,547,265 | Ramsey | July 28, 1925 |
| 2,141,530 | Guidroz | Dec. 27, 1938 |
| 2,433,409 | Walker | Dec. 30, 1947 |
| 2,461,150 | Flynn et al. | Feb. 8, 1949 |
| 2,725,109 | Bouvier | Nov. 29, 1955 |
| 2,800,972 | Jacobson et al. | July 30, 1957 |
| 2,838,345 | Miller | June 10, 1958 |
| 2,855,059 | Sutherland | Oct. 7, 1958 |